United States Patent

Hoshikuki et al.

[11] Patent Number: 6,141,392
[45] Date of Patent: Oct. 31, 2000

[54] RECEIVE ANTENNA SELECTION METHOD AND DIVERSITY RECEIVER

[75] Inventors: Atsushi Hoshikuki; Satoru Ishii, both of Mobara, Japan

[73] Assignee: Futaba Denshi Kogyo K.K., Mobara, Japan

[21] Appl. No.: 08/888,234

[22] Filed: Jul. 3, 1997

[30] Foreign Application Priority Data

Jul. 10, 1996 [JP] Japan .................................. 8-198500

[51] Int. Cl.⁷ ..................................................... H04B 7/08
[52] U.S. Cl. .......................... 375/347; 455/269; 455/272
[58] Field of Search ...................................... 375/200, 202, 375/206, 208, 209, 210, 343, 346, 347, 349; 455/269, 272, 277.1

[56] References Cited

U.S. PATENT DOCUMENTS

| | | | |
|---|---|---|---|
| 4,672,658 | 6/1987 | Kavebrad et al. | 455/555 |
| 5,131,006 | 7/1992 | Kamerman et al. | 375/200 |
| 5,161,252 | 11/1992 | Higuchi et al. | 455/78 |
| 5,222,098 | 6/1993 | Yamamoto et al. | |
| 5,594,737 | 1/1997 | Pillekamp | 370/278 |
| 5,710,789 | 1/1998 | Snodgrass et al. | 375/202 |
| 5,740,526 | 4/1998 | Bonta et al. | 455/277.2 |
| 5,748,676 | 5/1998 | Mahaby | 375/260 |

*Primary Examiner*—Nguyen Vo
*Assistant Examiner*—Congvan Tran
*Attorney, Agent, or Firm*—Oblon, Spivak, McLelland, Maier & Neustadt, P.C.

[57] ABSTRACT

A receive antenna selection method and a diversity receive capable of preventing a deterioration in transmission efficiency in a multipath environment. A receive antenna for receiving a packet is selected during a period of time for which a preamble section of the packet is received, to thereby keep change-over between packets from being carried out during receiving of the packet. This eliminates a situation that a packet must be nullified due to generation of a bit error by change-over between receive antennas during receiving of the packet, to thereby keep transmission efficiency from being deteriorated even in a multipath environment.

2 Claims, 2 Drawing Sheets

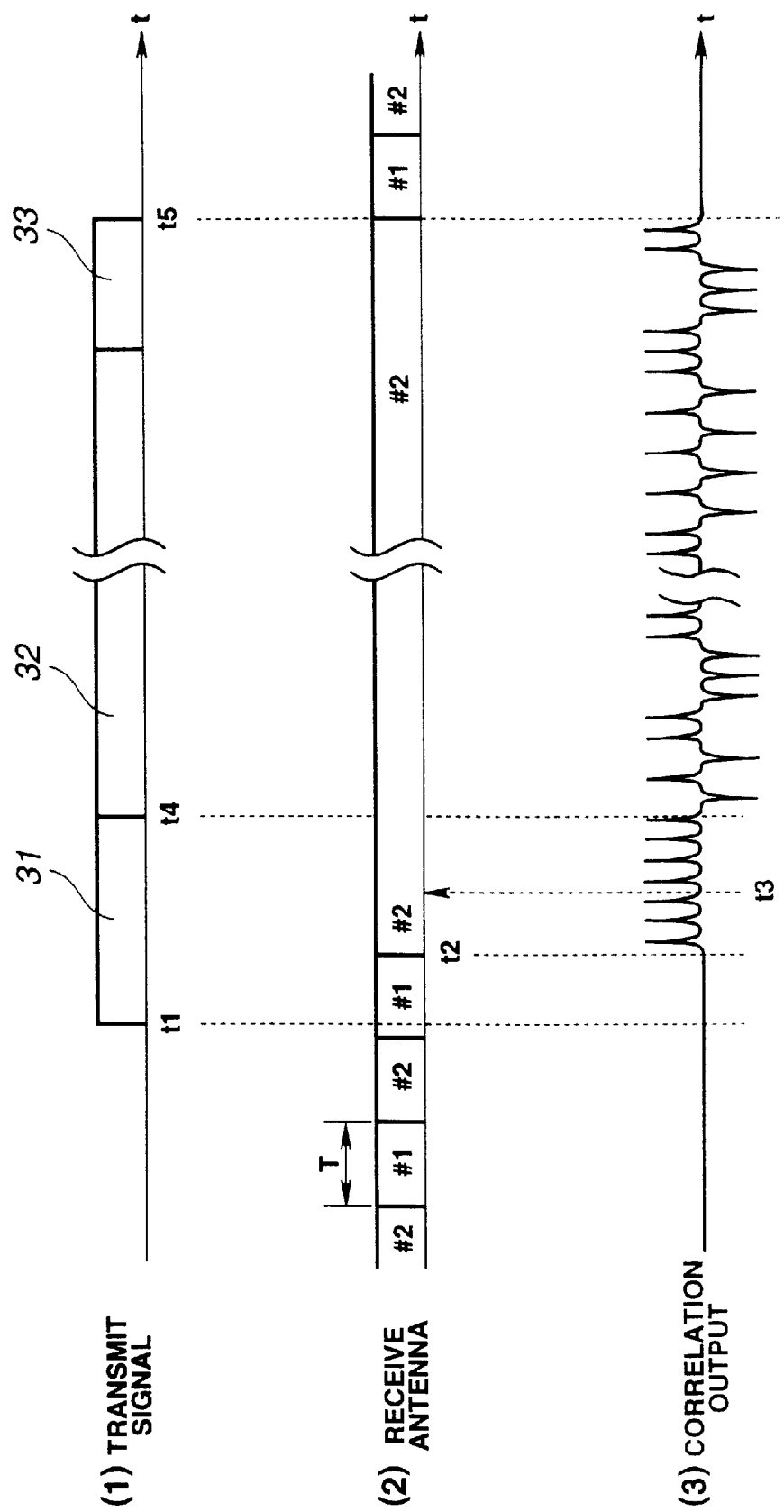

RECEIVE ANTENNA SELECTION METHOD AND DIVERSITY RECEIVER

BACKGROUND OF THE INVENTION

This invention relates to a receive antenna selection method and a diversity receive, and more particularly to a receive antenna change-over method and a diversity receiver in a radio packet communication system.

A spread spectrum (hereinafter also referred to as "SS") modulation system is adapted to transmit a signal which has been subject to modulation while substantially increasing a band width of the signal, as compared with that by a narrow-band modulation. The SS modulation systems include a direct sequence (hereinafter also referred to as "DS") system, a frequency hopping (hereinafter also referred to as "FH") system and the like. The spread spectrum system provides satisfactory crosstalk-proof characteristics and exhibits increased resistance to each of jamming, interference by a narrow band and a variation in transmission path. Thus, it has recently come to notice in the field of radio communication such as radio LAN, mobile communication or the like.

In radio communication, radio waves outputted from a transmitter are guided to an antenna of a receiver through a plurality of paths while being reflected by a wall, a ceiling and the like. The radio waves thus propagated through such plural paths interfere with each other at an end of the receive antenna, to thereby amplify or attenuate each other, leading to a phenomenon called multipath fading.

In such a multipath fading environment, even if the SS system which is said to exhibit increased resistance to interference or radio interference, an bit error often occurs due to the fading when most or all of spectra spread falls or a spread code series length is reduced.

In order to eliminate such an influence of the multipath fading, a change-over diversity system has been employed irrespective of the narrow-band communication or SS communication. The change-over diversity systems include (1) a space diversity system constructed so as to use a plurality of antennas arranged at places spaced from each other by a distance corresponding to a quarter wavelength, (2) a polarization diversity system using a horizontally polarized wave and a vertically polarized wave, (3) a frequency diversity system adapted to transmit identical information by means of a plurality of carriers, (4) an angular or directional diversity system having a plurality of directional antennas arranged in directions different from each other, (5) a time diversity system for transmitting identical information in a slot plural times, and the like. In general, a diversity system such as any one of the systems (1) to (3) wherein a plurality of diversity receive antennas are arranged and a receiver selects any one of the antennas which is ready for receiving of a signal is employed.

Changing-over among the plural receive antennas in the diversity system described above is carried out by detecting a failure in receiving of a signal such as, for example, generation of a bit error in a signal received.

Thus, a radio data communication system such as a radio LAN or the like fails in normal receiving of a signal, because even when change-over among the receive antennas is carried out after generation of a bit error, bit data received before the changing-over constitute an error. Employment of the antenna diversity system in the radio data communication system still fails to substantially improve a receive bit error rate.

A radio packet communication system is so constructed that a whole packet carries out error check, to thereby nullify or discard the whole packet when any bit error is detected in even only one bit of the packet. Thus, a bit error in even only one bit affects the whole packet, resulting in transmission efficiency thereof being highly deteriorated.

SUMMARY OF THE INVENTION

The present invention has been made in view of the foregoing disadvantage of the prior art.

Accordingly, it is an object of the present invention to provide a receive antenna selection method which is capable of satisfactorily carrying out changing-over among diversity receive antennas without generating any error in a spread spectrum communication system used in a multipath environment.

It is another object of the present invention to provide a receive antenna selection method which is capable of effectively preventing a deterioration in transmission efficiency.

It is a further object of the present invention to provide a diversity receiver which is capable of satisfactorily carrying out changing-over among diversity receive antennas without generating any error in a spread spectrum communication system used in a multipath environment.

It is still another object of the present invention to provide a diversity receiver which is capable of effectively preventing a deterioration in transmission efficiency.

In accordance with one aspect of the present invention, a receive antenna selection method in a radio packet communication system of the spread spectrum modulation type is provided. The method includes the step of selecting a diversity receive antenna to be used for receiving a packet depending on a correlation output generated when a preamble section of the packet is received.

In a preferred embodiment of the present invention, the diversity receive antenna is used for receiving the packet when peaks in a predetermined number or more are detected in the correlation output.

In accordance with another aspect of the present invention, a diversity receiver for a spread spectrum radio packet communication system is provided. The diversity receiver includes a plurality of diversity receive antennas, a reverse spread demodulation circuit, and a receive antenna change-over circuit for selecting any one of a plurality of the diversity receive antennas to connect it to the reverse spread demodulation circuit. The reverse spread demodulation circuit executes processing of correlation between a receive signal inputted thereto from the diversity receive antenna connected thereto by means of the receive antenna change-over circuit and a spread code thereof. The diversity receiver also includes a change-over control circuit for controlling the receive antenna change-over circuit. The change-over control circuit is constructed so as to carry out control in a manner to attain selection between a plurality of the diversity receive antennas while changing over the plurality of diversity receive antennas in order during a period of time for which any correlation peak is not detected during outputting of the reverse spread demodulation circuit and not to attain change-over between a plurality of the diversity receive antennas when correlation peaks in a predetermined number or more are detected during outputting of the reverse spread demodulation circuit.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 2 is a timing chart showing execution of a receive antenna selection method according to the present invention.

DETAILED DESCRIPTION OF THE PREFERRED EMBODIMENT

Now, the present invention will be described hereinafter with reference to the accompanying drawings.

Figure 1A:
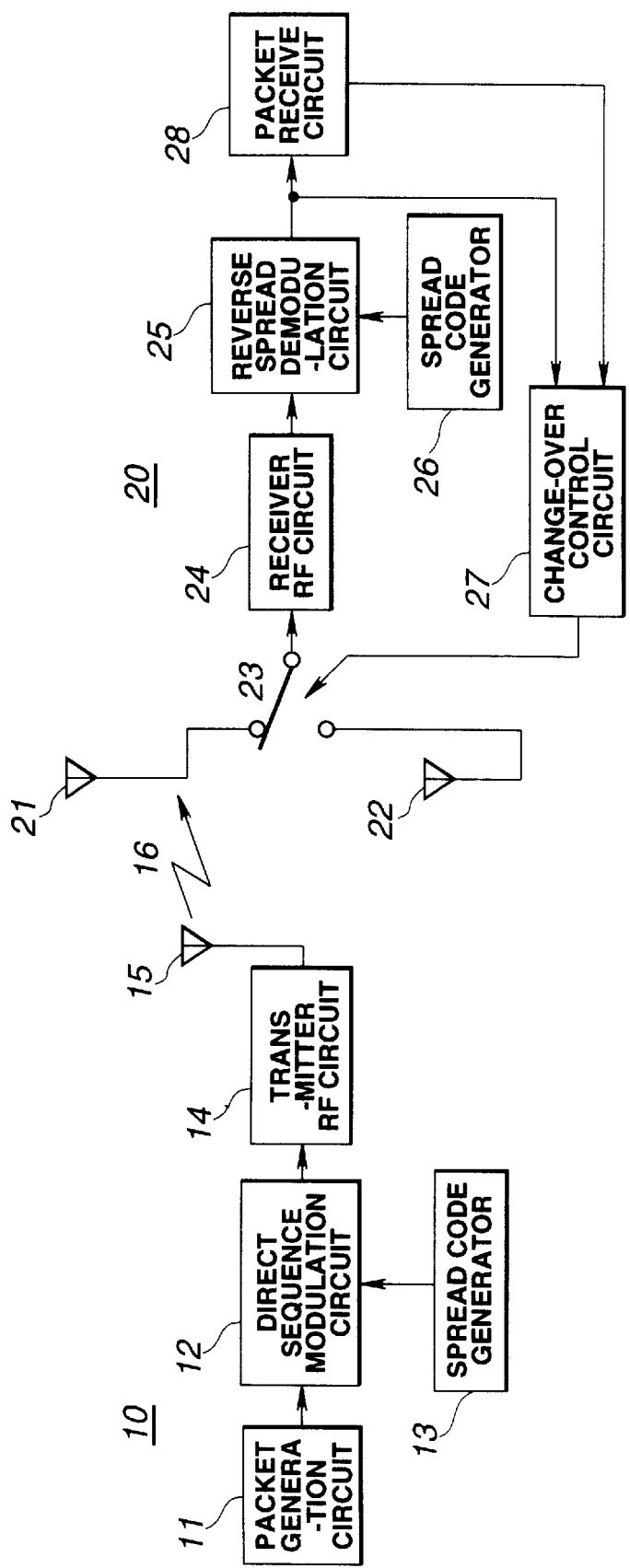
FIG. 1(a) is a block diagram showing a spread spectrum radio packet communication system to which a receive antenna selection method according to the present invention is applied.

Referring first to FIG. 1(a), a radio packet communication system of the direct sequence modulation type to which a receive antenna selection method according to the present invention may be applied is illustrated. In FIG. 1(a), reference numeral 10 designates a transmitter constructed so as to transmit a radio packet which has been subject to DS modulation, 11 is a packet generation circuit for generating a transmit packet, 12 is a direct sequence modulation circuit and 13 is a spread code generation circuit for generating a spread code series. The direct sequence modulation circuit 12 functions to multiply a packet generated by the packet generation circuit 11 and a spread code series generated by the spread code generator by each other. Reference numeral 14 indicates a transmitter radiofrequency (RF) circuit for modulating an output of the direct sequence modulation circuit 12 to convert it into a radiofrequency signal of a predetermined band and 15 is a transmit antenna.

Reference numeral 20 designates a diversity receiver to which a receive antenna selection method of the present invention is applied. In the illustrated embodiment, the diversity receiver 20 is constructed into a space diversity type provided with two antennas. The diversity receiver 20 includes a first receive antenna 21, a second receive antenna 22, a receive antenna change-over circuit 23 for selecting any one of receive signals from the first and second receive antennas 21 and 22, a receiver radiofrequency circuit 24 for converting a receive signal fed from the receive antenna change-over circuit 23 into an intermediate frequency signal, a reverse spread demodulation circuit 25, and a spread code generator 26 for generating a spread code series. The reverse spread demodulation circuit 25 functions to subject an intermediate frequency signal outputted from the receiver radiofrequency circuit 24 and a spread code series generated from the spread code generator 26 to correlation, to thereby generate a correlation signal. The diversity receiver 20 also includes a receive antenna change-over control circuit 27 for generating a receive antenna change-over control signal based on a correlation signal outputted from the reverse spread demodulation circuit 25 to feed the receive antenna change-over control signal to the receive antenna change-over circuit 23. Reference numeral 28 is a packet receive circuit.

Figure 1B:
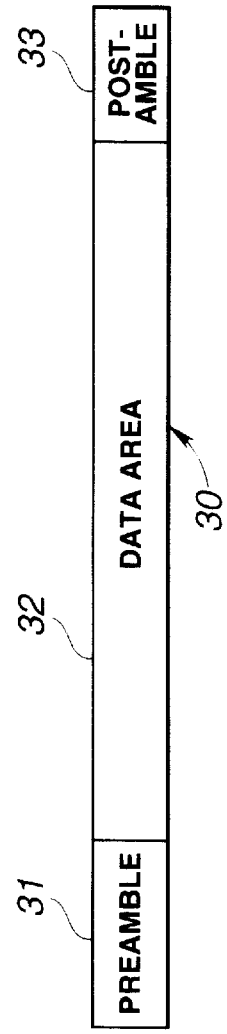
FIG. 1(b) is a block diagram showing a transmit packet to which a receive antenna selection method according to the present invention is applied.

A packet generated in the packet generation circuit 11 is illustrated in FIG. 1(b) by way of example. As shown in FIG. 1(b), each of packets 30 generated is constituted by a preamble section 31, a data area section 32 and a postamble section 33. The preamble section 31 functions to indicate start of the packet and take synchronism for demodulation on a receive side. For this purpose, it is set to be, for example, "1" or "0" which is continuous over a range extending from several symbols to tens of symbols.

The data area section 32 is adapted to store therein a body of data communicated and the postamble section 33 is adapted to store an error detection code such as, for example, a CRC code therein and indicate termination of the packet. The postamble section may be eliminated as desired.

In the transmitter 10 constructed as described above, information to be communicated is fed to the transmit packet generation circuit 11, in which an error detection code is added to the information, followed by addition of the preamble section 31 to the information, so that the above-described transmit packet 30 may be generated. The transmit packet 30 thus generated is multiplied by a high-speed spread code series including a pseudo noise (PN) generated by the spread code generator 13 and allocated to the transmitter 10, a gold code and the like, to thereby provide a spread modulation signal having a spectrum spread over an increased band. The spread modulation signal thus provided is converted into a signal of a predetermined radiofrequency band in the transmitter radiofrequency circuit 14 and then transmitted in the form of a transmit signal 16 from the transmit signal to the receiver 20.

The transmit signal thus transmitted is received by the first receive antenna 21 and second receive antenna 22 of the diversity receiver 20. The signal received by each of the receive antennas 21 and 22 is fed to the receive antenna change-over circuit 23, which selects any one of the signals received by the antenna 21 and that by the antenna 22, as described above. The signal selected is inputted to the receiver radiofrequency circuit 24, which converts it into an intermediate frequency signal, which is then inputted to the reverse spread demodulation circuit 25. The reverse spread demodulation circuit 25 acts to subject the intermediate frequency signal to correlation with the spread code series allocated to the receiver, to thereby generate a correlation output. The correlation output is fed to the packet receive circuit 28 for processing of receive packet data, as well as the receive antenna change-over control circuit 27.

When a signal received by the receiver is a signal transmitted from the transmitter corresponding to the receiver, the signal is subject to spread modulation by means of a spread code series identical with the spread code series used for the correlation processing (reverse spread processing) in the reverse spread demodulation circuit 25, so that a peak appears on a correlation output thereof. Whereas, when it is a signal transmitted from a different transmitter, it is subject to spread modulation using a different spread code series, so that any correlation peak does not appear on an output of the reverse spread demodulation circuit 25. Also, if the signal is a signal transmitted from the corresponding transmitter, any correlation peak does not appear on the output when a receive power level is reduced due to the above-described multipath fading. Thus, the signal having the correlation peak may be used as a reference signal for change-over between the receive antennas.

In the receive antenna selection method of the present invention, change-over between the receive antennas is carried out using the correlation peak outputted at the time of receiving of the preamble section. The change-over takes place at timings shown in FIG. 2, wherein (1) shows a signal transmitted from a transmit station, (2) is an antenna used for receiving of the signal and (3) is a correlation signal outputted from the reverse spread demodulation circuit 25. In FIG. 2, during a period of time for which the reverse spread demodulation circuit 25 is kept from outputting any packet signal, the change-over control circuit 27 carries out alternate change-over between the first receive antenna 21 ("#1" in FIG. 2) and the second receive antenna 22 ("#2" in FIG.

2) at a predetermined cycle T, to thereby wait for receiving of the signal. The cycle T is set to be several times as large as a length of the spread code series used in the system.

It is supposed that transmission of the packet 30 from the transmitter 10 is started at time t1 as indicated at (1) in FIG. 1 and the first receive antenna 21 is selected by the antenna change-over circuit 25 as indicated at (2). If signals propagated through a plurality of paths and received by the first receive antenna attenuate each other to keep the packet exhibiting sufficient signal intensity from being received by the first receive antenna, any correlation peak is not detected in an output signal of the reverse spread demodulation circuit 25. This keeps a correlation peak signal from being inputted to the change-over control circuit 27 as indicated at (3) in FIG. 2, so that a control signal for carrying out change-over from the first receive antenna to the second receive antenna at time t2 at which a period of time T has elapsed after change-over to the first receive antenna 21 is fed to the change-over circuit 23.

Supposing that the second receive antenna 22 is kept at a state which permits it to satisfactorily receive a signal, a correlation peak is detected on an output of the reverse spread demodulation circuit 25 after change-over to the second receive antenna 22 at time t2 as indicated at (3) in FIG. 2. The signal of the correlation peak is then inputted to the change-over control circuit 27, which judges whether or not outputting of the correlation peak is detected a predetermined number of times or more. As a result, when a predetermined number of correlation peaks are detected, the change-over control circuit 27 makes judgment that the change-over control circuit 27 has received a transmit packet from the transmit station, to thereby decide to use the receive antenna or second receive antenna 22 during a period of time for which the packet is received, resulting in controlling the change-over circuit 23 so that it does not carry our change-over between the receive antennas at time t3. Thus, the second receive antenna 22 is used during a term of the packet.

When transmission of the packet is terminated at time t5, a signal is outputted from the packet receive signal 28 which has detected the postamble section 33 of the packet to the receive antenna change-over control circuit 27. This permits the receive antenna change-over control circuit 27 to be returned to a receive standby state for selectively carrying out change-over between the first receive antenna 21 and the second receive antenna 22 at the cycle T.

Usually, a cycle of variation in receive level due to multipath fading is highly decreased as compared with a cycle of the spread code. Thus, there is substantially reduced likelihood that a failure in receiving occurs during receiving of the packet when it is normally received at the preamble section. In this connection, if any error occurs during receiving of the packet, the packet is nullified or discarded in the packet processing circuit 28.

When two such receive antennas are arranged as described above, it is preferable that relationship between a length $T_p$ of the preamble section 31 and the cycle T of change-over between the receive antennas is set to be about $T_p=3T$, to thereby permit change-over between the receive antennas to be carried out three times during the preamble period $T_p$.

Also, the illustrated embodiment is so constructed that termination of the packet 30 is detected in the packet receive circuit 28. Alternatively, it may be so constructed that the change-over control circuit 27 judges termination of the packet when the correlation output of the reverse spread demodulation circuit 25 is not detected, to thereby permit the receive antenna change-over control circuit 27 to be returned to a receive standby state for alternately carrying out change-over between the first receive antenna 21 and the second receive antenna 22.

The above description has been made in connection with the space diversity system by way of example. However, the present invention is not limited to the system. For example, it may be applied to any other suitable diversity system in which a plurality of antennas are arranged, such as a polarization diversity system, a directional diversity system or the like.

Also, the above-described embodiment is applied to arrangement of two receive antennas. However, the present invention may be suitably applied to arrangement of three or more receive antennas. Further, the present invention may be applied to change-over between receive frequency bands in a frequency diversity system without any change.

As can be seen from the foregoing, the present invention is constructed so as to select a receive antenna for receiving a packet during a period of time for which a preamble section of the packet is received, to thereby keep change-over between packets from being carried out during receiving of the packet. Such construction effectively eliminates a situation that a packet must be nullified due to generation of a bit error by change-over between the receive antennas during receiving of the packet, to thereby keep transmission efficiency from being deteriorated even in a multipath environment.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A diversity receiver for a spread spectrum radio packet communication system, comprising:

a plurality of diversity receive antennas;

a reverse spread demodulation circuit;

a receive antenna change-over circuit for selecting any one of said plurality of diversity receive antennas to connect it to said reverse spread demodulation circuit;

said reverse spread demodulation circuit executing processing of correlation between a receive signal inputted thereto from said diversity receive antenna connected thereto by means of said receive antenna change-over circuit and a spread code thereof; and a change-over control circuit for controlling said receive antenna change-over circuit;

said change-over control circuit carrying out control so as to attain selection between said plurality of diversity receive antennas while changing over said plurality of diversity receive antennas in order during a period of time for which any correlation peak is not detected during outputting of said reverse spread demodulation circuit and so as not to attain change-over between said plurality of diversity receive antennas when correlation peaks in a predetermined number or more are detected during outputting of said reverse spread demodulation circuit.

2. Method of selecting a receive antenna in a radio package communication system of the spread spectrum modulation type, comprising the steps of:

receiving a signal which includes a preamble section alternately from each of a plurality of diversity receive antennas;

generating a correlation output from said preamble and a spread code series;

selecting one of said plurality of diversity receive antennas to be used for receiving said signal based on the first antenna having a predetermined number of peaks in said correlation output.

* * * * *